Figure 1:
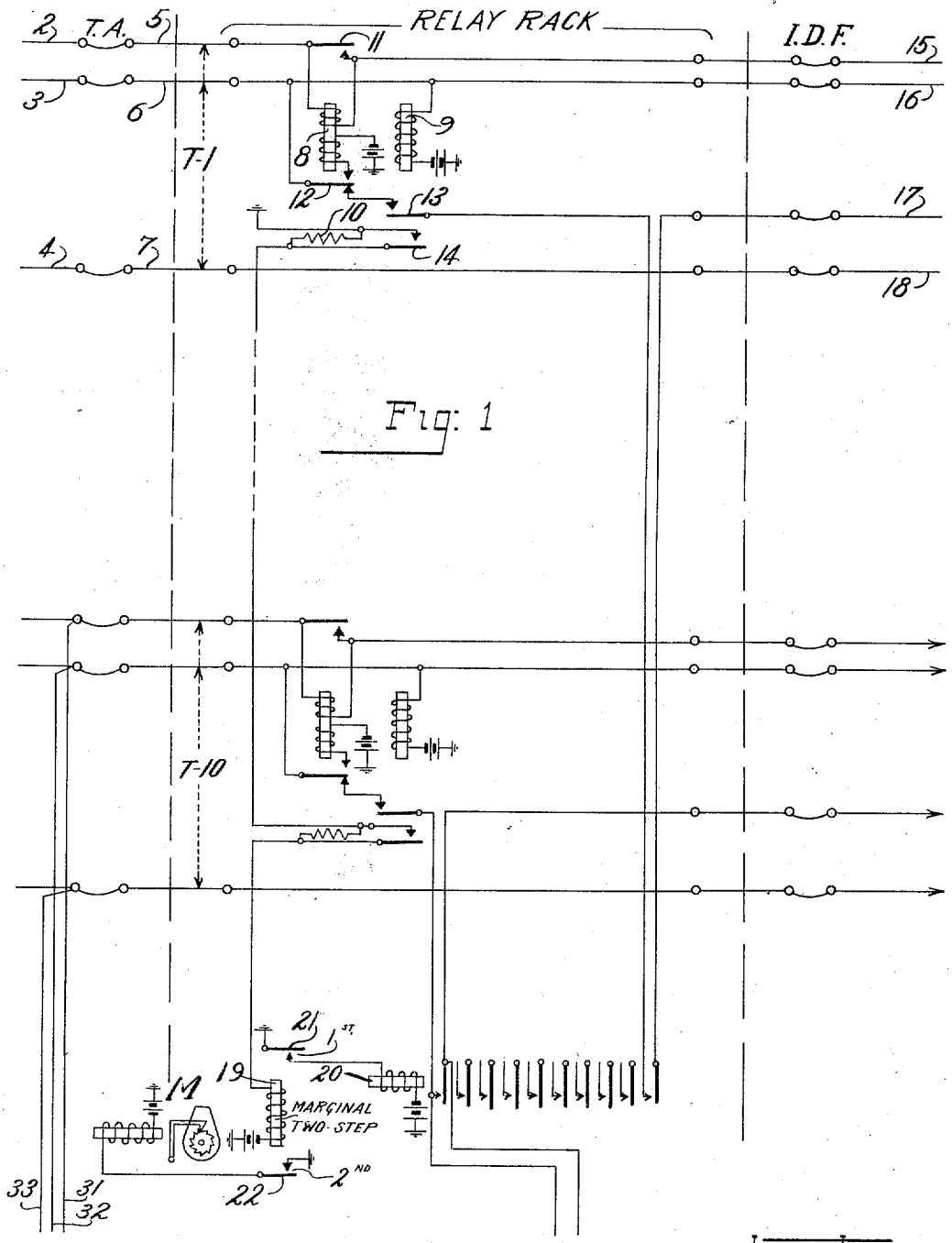

J. WICKS

March 1, 1932. TELEPHONE TRUNKING SYSTEM Re. 18,373

Original Filed Sept. 23, 1925 3 Sheets-Sheet 1

Inventor
John Wicks

R G Richardson Atty.

J. WICKS

TELEPHONE TRUNKING SYSTEM

March 1, 1932. Re. 18,373

Original Filed Sept. 23, 1925 3 Sheets-Sheet 2

Inventor
John Wicks

R. G. Richardson Atty.

J. WICKS

March 1, 1932. TELEPHONE TRUNKING SYSTEM Re. 18,373

Original Filed Sept. 23, 1925 3 Sheets-Sheet 3

Inventor
John Wicks

R. B. Richardson Atty.

Reissued Mar. 1, 1932

Re. 18,373

UNITED STATES PATENT OFFICE

JOHN WICKS, OF OAK PARK, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

TELEPHONE TRUNKING SYSTEM

Original No. 1,748,966, dated March 4, 1930, Serial No. 57,985, filed September 23, 1925. Application for reissue filed April 27, 1931. Serial No. 533,317.

The present invention relates to telephone trunking systems in general, but is concerned more particularly with trunking systems of the type in which non-numerical trunk hunting switches are employed. Record is made of the Patent No. 1,528,751, issued March 10, 1925, to Bellamy and Wicks.

The broad general object of the present invention is the production of new and improved circuit arrangements, whereby secondary trunking systems of the type described in the above patent are suitably revised to incorporate certain characteristics found to be useful in actual practice.

Specifically, one object of the invention is concerned with the improvement of the operation of the secondary switches so that when an idle one is taken for use, at a time when others are hunting within the same primary sub-group, the likelihood of a false operation of the rotary magnet of the seized switch is eliminated.

A further object of the invention is the production of new and improved circuit arrangements whereby the relays of the secondary switches may be removed from the switches themselves and placed on the primary side of the intermediate distributing frame in order that all the relays of each primary sub-group may be mounted as a unit. This makes the running of the chain circuit for controlling the starting of the secondary switches a much simpler operation.

Another object of the invention is to adapt the circuits so that the so-called "individual" and "common" trunking arrangement may be applied to the primary sub-groups. To this end, a double chain-circuit arrangement has been developed for the common trunks.

Another object of the invention relates to the provision of circuit arrangements for preventing an excessive number of switches from hunting simultaneously within the same secondary sub-group, together with arrangements for permitting small sections of the secondary switches in the same sub-group to hunt successively until the congested condition has been relieved.

A feature of the invention relates to the provision of a meter associated with the chain relay equipment for indicating when all the trunks in a given primary sub-group become busy.

Figure 2:
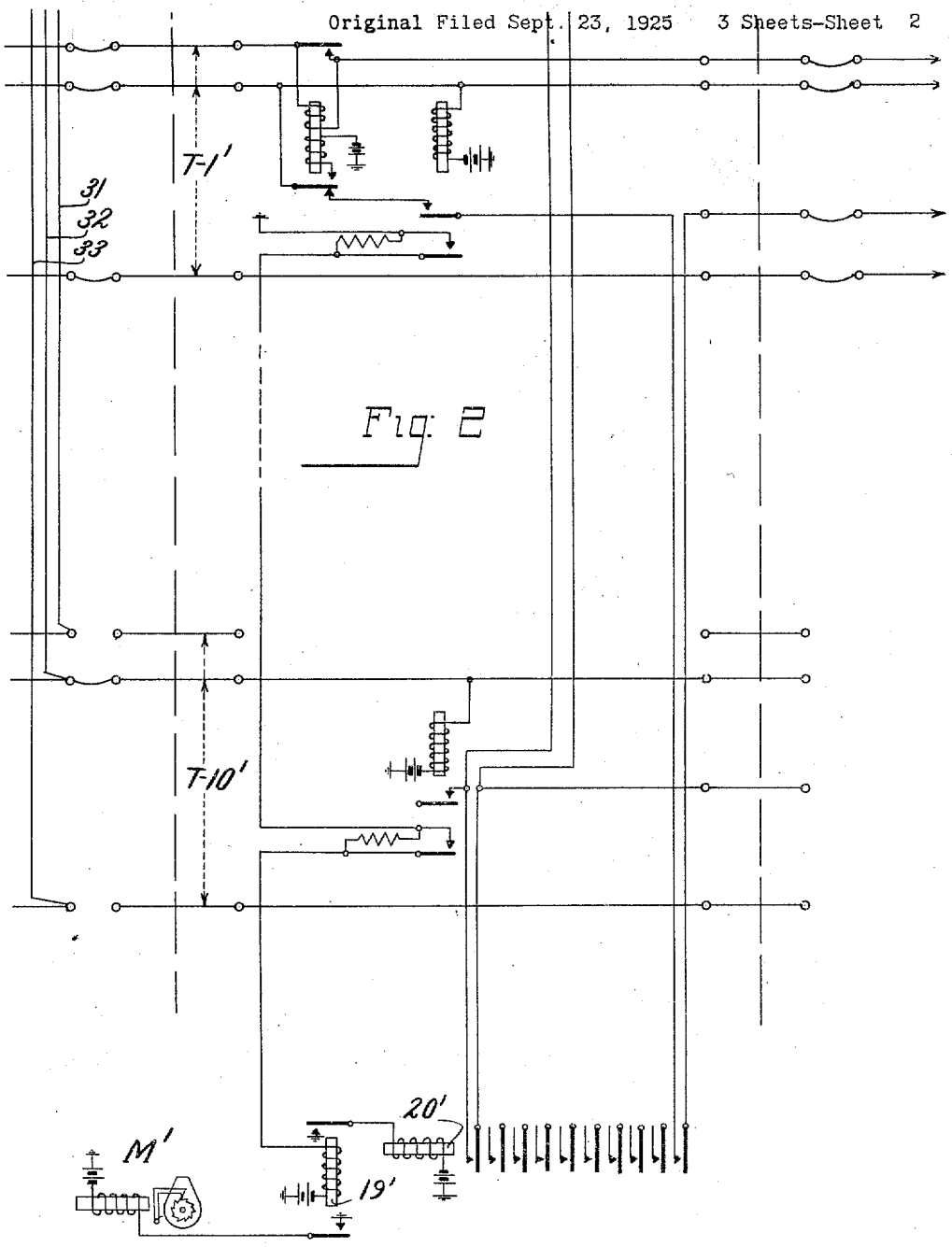
Figure 3:
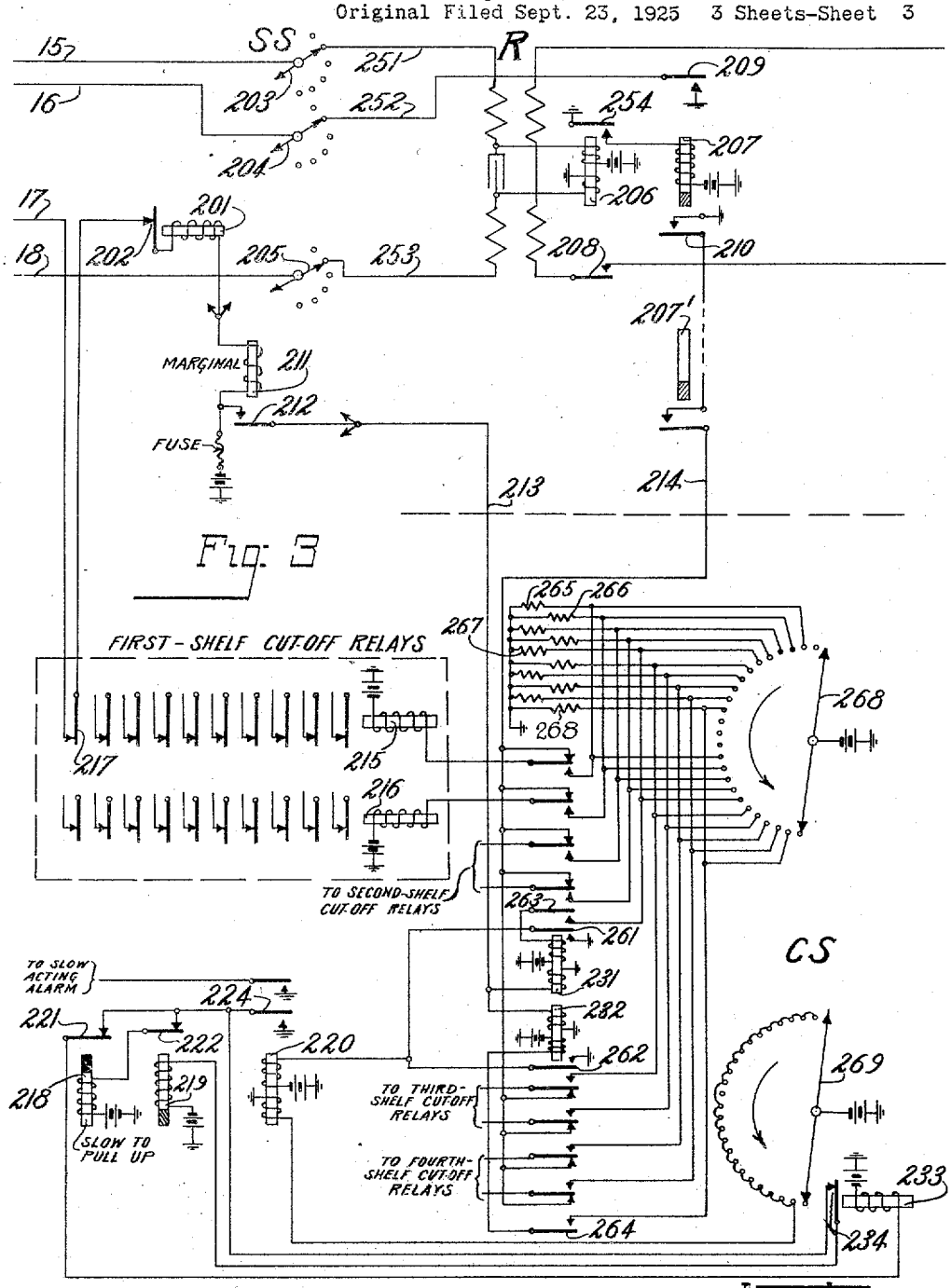

Referring now to the drawings comprising Figs. 1–3, inclusive, these drawings show, by means of the usual circuit diagrams, a certain amount of apparatus in a telephone system embodying the principles of the invention. In order for the drawings to be understood best, Fig. 2 should be placed below Fig. 1, and Fig. 3 should be placed to the right of Fig. 1. When the drawings are thus laid out, Figs. 1 and 2 show two primary sub-groups of trunks with their common equipment, and Fig. 3 shows a portion of a single secondary sub-group, together with certain equipment common to the sub-group.

The terms "primary sub-group" and "secondary sub-group" will be understood upon reference to the above mentioned patent.

Referring now particularly to Figs. 1 and 2, the vertical row of terminals at the left of the two sheets and labeled T. A. at the top of Fig. 1 represents terminals at the so-called "terminal assembly" which is the name commonly used to designate the frame at which the multiply connected bank terminals of a number of groups of selectors terminate. It is at this frame that the connections determining the number of selectors to feed traffic into a given primary sub-group are made.

The relays and other equipment, together with the associated vertical rows of terminals occupying the central portion extending vertically through the two sheets, are labeled Relay rack in Fig. 1. Trunk cables are run from the terminal assembly T. A. to the left-hand side of the relay track, and other trunk cables are run from the right-hand side of the relay rack to the left-hand side of the intermediate distributing frame I. D. F. It is at the I. D. F. that the jumpers are run to cross-connect the various trunks in the respective primary sub-groups with switches in the desired secondary sub-groups.

From the right hand side of the I. D. F., the cables extend to the secondary switches, one of which (the secondary switch SS) is shown in Fig. 3.

The two trunks shown in Fig. 1 are designated T—1 and T—10. From this, it will be understood that these two trunks are the first and tenth trunks, respectively, of a group of ten trunks accessible to a group of selector switches. It will be noted that the usual chain circuit is provided, extending through contacts on the chain relays of all the trunks in the primary sub-groups, whereby the chain relay 19 is operated to control the start relay 20 in the usual manner. The chain relay 19 is marginal, and is so adjusted that it does not operate with two of the resistances, such as 10, connected in series in it. When all the resistances, such as 10, except 1, are shunted, relay 19 (which is also a two-step relay) energizes through its first step and operates the start relay 20. When all resistances are short-circuited, relay 19 operates through its second step also, thereby operating the meter M so as to register the condition of all trunks busy within the sub-group. It will be noted that the start relay 20, upon operating, closes a point in the circuit of the stepping magnet of each of the associated trunks, so that such secondary switches as are idle and are standing on busy outgoing trunks operate to select idle trunks.

It will be noted that Fig. 2 shows two trunks T—1′ and T—10′, respectively. These latter trunks are the first and tenth trunks, respectively, of a separate primary sub-group. It will be noted that the trunk T—10′ is not provided with a line relay and that the line conductors are not closed through at the terminal assembly T. A. Instead, the traffic intended for trunk T—10′ is diverted through the conductors 31—33 to the trunk T—10, Fig. 1. That is, the trunk T—10, Fig. 1, is common to two groups of selectors. This is the well known scheme employed for obtaining a greater trunking efficiency by making certain trunks individual to each of two groups of switches and making certain other trunks common to the two groups, the individual trunks being first choice to the switches concerned and the common trunks being chosen by a given group of switches only after all the trunks individual to that group are busy.

Referring now particularly to Fig. 3, the secondary switch SS shown therein is mechanically of the well known type of switch in which the wipers have no normal position and in which the wipers are advanced upon the back stroke of the associated stepping magnet instead of upon the front stroke. Although the switch SS is shown diagrammatically as having only a few contacts, this switch is assumed to have (and in the layout herein disclosed does have) twenty-five sets of bank contacts. The control switch CS, from a mechanical standpoint, is similar to the secondary switch SS.

It is assumed, in the present case, that the traffic imposed on the group of outgoing trunks is such that eighty secondary switches, such as SS, are required to supply traffic to twenty-five outgoing trunks, it being assumed that the secondary switches, such as SS, have access to twenty-five trunks each, although only a few of the bank contacts of this switch are shown. It is assumed further that the secondary switches are mounted in rows of twenty switches each, each row being termed a "shelf". There is provided one battery-feed relay, such as 211, for each of the four shelves of switches, making four battery feed relays per sub-group. Also, there is provided, for each shelf of switches, two cut-off relays, such as 215 and 216, the relays 211, 215, and 216 being assigned to the shelf in which the secondary switch SS is located. The function of the battery feed relays, such as 211, is to start the common control switch CS, which controls the hunting operation in the different shelves when more than a predetermined number of switches start hunting.

In the patent hereinbefore referred to, an arrangement is described, whereby, when all the trunks outgoing from a particular sub-group are busy, a cut-off relay is operated to disconnect battery from the operating magnets of all the switches having access to the busy sub-group. The cut-off relays, such as 215 and 216, and the cut-off relays (not shown) for the other shelves correspond to the cut-off relay in the patent referred to. Accordingly, when all the outgoing trunks, such as the one outgoing from the repeater R, are busy, all the relays, such as relay 207, are energized and a chain circuit is completed through normally closed contacts on the relays 231 and 232 for all the cut-off relays of the sub-group, including relays 215 and 216. These relays, on operating, open the magnet circuits of all the associated secondary switches, such as the secondary switch SS. The same cut-off relays are employed in restricting the hunting movement under the control of the switch CS which operates to permit hunting by a small number of secondary switches at a time in a manner to be pointed out hereinafter.

The invention having been described generally, a detailed description of the operation of the apparatus disclosed will now be given. For this purpose, it will be assumed that the trunk T—1, Fig. 1, is seized by one of the selectors having access to it.

When the trunk T—1 is seized, a ground potential is extended over the release trunk conductor 3, through the terminal assembly T. A., the relay rack, and the I. D. F. to the release trunk conductor 16 of the secondary switch SS. Since the test wiper 204 of the switch SS is standing on the test contact of the repeater R, the ground potential is extended to the release trunk conductor 252 of the outgoing trunk, thereby making the trunk comprising conductors 251—253 busy in the usual manner. As a further result of the seizure of the trunk T—1, a circuit is closed over conductors 2 and 4 through the terminal assembly T. A., the relay rack, the I. D. F., conductors 15 and 19, wipers 203 and 205, and conductors 251 and 253 for the line relay 206 of the repeater R. The upper winding of the line relay 8 at the relay rack is included in the circuit of the line relay 206, with the result that relay 8 energizes and, at armature 12, opens a point in the circuit of the stepping magnet 201 of the secondary switch SS, and closes a locking circuit for its lower winding. At armature 11, relay 8 short circuits its upper winding subsequent to the closure of the locking circuit for its lower winding at armature 12. The chain relay 9 is energized responsive to the placing of the ground potential on the release trunk conductor of the trunk T—1 and closes at armature 13 a point in the circuit of the stepping magnet 201 of the secondary switch SS. This does not result in the closure of the circuit of the stepping magnet of the secondary switch SS owing to the fact that the adjustment of the relays 8 and 9 is such that relay 8 opens a point in the stepping magnet circuit at armature 12 before the operation of armature 13 of relay 9. As a further result of the energization of relay 9, the resistance 10 is short circuited at armature 14 so as to bring about the operation of relay 19 in a manner to be pointed out hereinafter.

In the repeater R, Fig. 3, line relay 206 energizes when its circuit is closed and it closes at armature 208 the usual control circuit for the switch to which the outgoing trunk extends, at the same time closing at armature 254 a circuit for release relay 207. Release relay 207 energizes and places ground on release trunk conductor 252 at armature 209 so as to maintain the preceding switches operated in the usual manner. At armature 210, relay 207 closes a point in the associated chain circuit, which operation does not produce any particular result as long as there are other trunks in the same sub-group that are not in use.

In response to the dialling of the remaining digits in the desired number, the interruptions thereby produced in the circuit of line relay 206 of the repeater R are relayed to the associated inter-office trunk at armature 208, whereupon the connection is extended to the desired line in the usual manner.

Upon the termination of the ensuing conversation, the calling subscriber replaces his receiver, whereupon line relay 206 falls back and opens at armature 208 the control circuit extending to the distant office, with the result that the switches in the distant office are released in the usual manner. The circuit of release relay 207 is opened at armature 254 and relay 207 falls back after an interval and removes ground at armature 209 from release trunk conductor 252. When this occurs, the relays 8 and 9, Fig. 1, fall back, restoring the associated circuits to the position shown in the drawings. Also, the preceding switches are released in the usual manner. It will be understood that the chain relay 9 operates whenever the associated release trunk conductor is grounded whether this is due to the trunk T—1 being taken for use or to the face that the secondary switch SS is standing on a busy trunk.

Assuming now that nine of the ten trunks of the primary sub-group shown in Fig. 1 are busy to the selectors having access to them, which condition comes about in the case of any one trunk if that trunk is actually in use or if the associated secondary switch is standing on a busy trunk, the marginal two-step relay 19 operates through its first step, operating the armature 21 to close a circuit for relay 20. The second step armature 22 is not operated at this time. Relay 20, upon energizing, closes points in the circuits of the ten associated stepping magnets, such as the stepping magnet 201, Fig. 3, of the secondary switch SS. Accordingly, such switches of this primary sub-group as are standing on busy trunks and are not themselves busy start searching for idle trunks. The stepping circuit for the secondary switch SS, for example, in case that switch is idle and is standing on a busy trunk is as follows: from ground by way of the busy test contact encountered by test wiper 204 of the secondary switch SS, release trunk conductor 16, connections at the I. D. F. and at the relay rack, armature 12 and its resting contact of relay 8, working contact and armature 13 of the chain relay 9, outer contacts of relay 20, connections at the I. D. F., conductor 17, resting contact and armature 217 of the cut-off relay 215, Fig. 3, interrupter contacts 202, stepping magnet 201 of the secondary switch SS, relay 211, and the associated fuse to battery. Stepping magnet 201, under the control of its self-interrupting contacts 202, advances the wipers 203—205 step by step in search of an idle trunk. This operation continues until an idle trunk is found, or until relay 20, Fig. 1, falls back, which it may do prior to the completion of the operation of the secondary switch SS in case some other switch is successful prior to the arrival of the wipers 203—205 on the bank contacts of an idle trunk.

When an idle trunk is found by one of the searching secondary switches, the chain relay of the trunk associated with the successful switch falls back and introduces a second resistance in the circuit of relay 19, whereupon relay 19 is restored to the position shown in the drawings, opening the circuit of relay 20. Relay 20 thereupon falls back and opens all the associated stepping magnet circuits.

It will be noted that for the purpose of keeping two idle trunks pre-selected in each primary sub-group, the trunk T—10, Fig. 1, belongs to the primary sub-group illustrated in Fig. 2 as much as it does to that shown in Fig. 1, being common to the two sub-groups. Accordingly, when ground is placed on the release trunk conductor of the trunk T—10, Fig. 1, a ground potential is extended over conductor 32 to the release trunk conductor of the trunk T—10′, Fig. 2. The result is that the chain relay on the trunk T—10′ operates simultaneously with the operation of the chain relay on the trunk T—10, Fig. 1, so that the chain relay contacts in both sub-groups are closed when the truck is in use from either of the two sub-groups.

It will be noted that the left-hand contacts of the relay 20, Fig. 1, are multipled to the left-hand contacts of the relay 20′, Fig. 2, so that, when idle, the secondary switch to which the trunk T—10 extends may be operated from the start relay of either sub-group. This arrangement is obviously necessary as, during heavy traffic, the trunk T—10 may, at times, be the only idle trunk available from either of the two sub-groups.

In case the relay 19, Fig. 1, operates to pull up the start relay 20 and the last remaining trunk is taken for use before a new one can be preselected, the last remaining resistance in the circuit of relay 19 is short circuited, whereupon relay 19 operates through its second step and closes a circuit for the meter M to register the momentary condition when all the trunks in the sub-group are busy to the associated selectors. An occasional operation of the meter M, therefore, will not indicate an abnormal state of affairs, but, in case the sub-group is consistently overloaded, the frequent operation of the meter M should indicate the fact.

Referring now to the operation of the control equipment shown in Fig. 3, it has been found in practice that, when there are only two or three trunks idle in a given secondary sub-group, there is a tendency for a great number of idle secondary switches to preselect the same idle trunk. Now in case the conditions are somewhat congested at the corresponding primary sub-groups, most of the idle secondary switches of the large group collected on the same trunk start hunting simultaneously when the idle trunk is taken for use by one of these switches. This leads to two difficulties. In the first place, the ground potential is supplied to the release trunk conductors of busy trunks through relatively light relay contacts, with the result that these contacts are often unable to carry safely the comparatively large amount of current necessary to energize the stepping magnets of a large number of secondary switches. Furthermore, the test wipers of the secondary switches are of the bridging type, i. e., a test wiper encounters the next contact before it breaks contact with the one which it is leaving. Accordingly, when the large number of switches are rotating synchronously, with one switch lagging slightly behind, the test wiper of this one switch supplies ground to energize the stepping magnets of all the other switches in case the group of simultaneously operating switches is just passing from a busy trunk to an idle one. This sometimes results in the test wiper of the lagging switch becoming damaged due to the excessive current carried by it.

This condition is remedied in the present case by restricting the hunting action when it becomes too congested within a given secondary sub-group, as will now be explained. It may be pointed out that the battery feed relay 211, which supplies battery to the motor magnets of a shelf of twenty secondary switches, is adjusted so that it does not operate until a pre-determined number of secondary switches in the associated shelf are operating simultaneously. It has been found in practice that in most cases, the best control of the hunting operation of the switches is secured with the relay 211 adjusted so that it will not operate with three switches rotating but will operate in case four switches are rotating in the associated shelf. When this condition arises in the shelf associated with relay 211, the said relay operates and at armature 212 places battery upon the conductor 213 common to the battery-feed relays of the four shelves of the secondary sub-group. Relays 231 and 232 both operate over conductor 213 and over their lower and upper windings, respectively. At armatures 263 and 264, relays 231 and 232 close locking circuits for their upper and lower windings, respectively, through the resistances 267 and 268. At the two upper armatures of relay 231, relays 215 and 216 are disconnected from the common conductor 214 and are connected to ground through the resistances 265 and 266, respectively. Relays 215 and 216 energize and open the associated stepping magnet circuits. The cut-off relays of the second, third, and fourth shelves of this sub-group are energized similarly.

At armatures 261 and 262, a circuit is closed for the upper winding of relay 220. Relay 220 energizes and closes at armature 224 a circuit through the resting contact and armature 222 for the slow-to-pull-up relay 218. A circuit is closed through contact 234 of stepping magnet 233 for relay 219 with the result that relay 219 operates and opens at armature 222 the circuit of relay 218 before relay 218 has had time to operate. A further circuit is closed through the resting contact and armature 221 for stepping magnet 233 of the control switch CS. Stepping magnet 233 energizes preparatory to advancing the wipers 268 and 269 and at contacts 234 opens the circuit of relay 219. Relay 219 now falls back and at armature 222 again closes the circuit of the slow-to-pull-up relay 218, with the result that relay 218 energizes after a slight interval and opens at armature 221 the circuit of magnet 233. Magnet 233 falls back and closes at contacts 234 the circuit of relay 219 at the same time advancing the wipers 268 and 269 one step in a counter-clockwise direction. Wiper 269 closes a circuit through the first associated bank contact for the lower winding of relay 220 so as to maintain this relay energized until the control switch CS has completed its cycle of operation. Wiper 268, however, encounters a dead contact and does not, therefore, produce any result at this time. This dead contact is placed in the bank of the wiper 268 so as to delay the control of the hunting operations until the operation of the interrupting relays 218 and 219 has become steady, as this operation may be somewhat irregular until the first two steps have been taken.

Responsive to the closure of the circuit of relay 219 at contacts 234 when magnet 233 falls back, relay 219 energizes again and opens at armature 222 the circuit of relay 218. Relay 218 falls back after an interval and closes at armature 221 the circuit of magnet 233 again. The result is that magnet 233 pulls up preparatory to a further advance of the associated wipers, and at armature 234 opens the circuit of relay 219. Relay 219 again falls back with the result that relay 218 pulls up and opens at armature 221 the circuit of stepping magnet 233, whereupon stepping magnet 233 falls back and advances the wipers 268 and 269 one step. Wiper 268, at this time places battery on the junction of cut-off relay 215 and the resistance 265. The result is that cut-off relay 215 falls back and closes points in the circuits of the ten associated secondary switches so that the ones that are attempting to hunt may now do so.

The operation of the switch CS under the control of relays 218 and 219 continues in the manner described, with the result that upon the next step of wiper 268, relay 215 is again energized and relay 216 is deenergized in its stead. Upon the next two succeeding steps, the cut-off relays of the second shelf are deenergized momentarily and, upon the fifth effective step of wiper 268, the locking winding of relay 231 is short circuited, whereupon relay 231 falls back and permits the cut-off relays of the first two shelves to fall back in case battery has been removed from conductor 213.

Upon the succeeding steps of the control switch CS, the four cut-off relays of the third and fourth shelves are successively deenergized, after which the locking winding of relay 232 is short circuited. Relay 232 now falls back in case battery has been removed from conductor 213 and permits the deenergization of the cut-off relays of the third and fourth shelves. It will be understood, of course, that in case the congested condition remains at one of the shelves, relays 231 and 232 remain energized and the above operation is repeated.

Assuming, however, that the battery disappears from the common conductor 213 prior to the short circuiting of the locking winding of relay 231 and that relays 231 and 232 are now both deenergized, the initial energizing circuit of relay 220 is now open at armatures 261 and 262. Relay 220 remains energized through its locking circuit, however, until wiper 269 takes another step and lands on the dead contact shown. The next cycle of operations of the control switch CS begins with the wipers in this position.

What is claimed is:

1. In a telephone system, a group of primary trunks divided into sub-groups, a group of secondary trunks divided into sub-groups, separate sub-groups of secondary switches having access to said secondary-trunk sub-groups, respectively, a distributing frame at which said primary trunks terminate and from which connections are made to said secondary switches, said frame including jumpers for connecting any desired primary trunk with any desired secondary switch, and relays connected with said primary trunks whereby said secondary switches are controlled by said relays through said jumpers.

2. In a non-numerical trunking system in which the primary trunks terminate in non-numerical secondary switches having access to secondary trunks and in which an intermediate distributing frame is provided through which the primary trunks are connected by means of jumpers to the secondary switches, two relays connected in each of said primary trunks on the primary trunk side of the intermediate distributing frame for controlling said secondary switches.

3. In a telephone system, an automatic switch, a trunk line terminating in said switch and including a test conductor, a stepping magnet for said switch having a circuit including said test conductor, a relay permanently connected to said test conductor, and means for operating said relay over said test conductor to close a point in said circuit each time the relay is operated.

4. In a telephone system, a trunk line including a talking conductor and a test conductor terminating in an automatic switch, a motor magnet for said switch, a circuit for said magnet, means controlled over said talking conductor responsive to a seizure of said trunk line for opening one point in said circuit, and means controlled over said test conductor for closing another point in said circuit whenever a busy potential is present on the test conductor.

5. In a telephone system, a trunk line terminating in an automatic switch and comprising two talking conductors and a test conductor, a relay connected to one of said talking conductors, a relay connected to said test conductor, a motor magnet for said switch, a circuit for said magnet, said circuit including normally closed contacts on the first named relay and normally open contacts on the second relay, and means responsive to a seizure of said trunk line for energizing both of said relays.

6. In a telephone system, two groups of trunk lines accessible to two groups of switches, respectively, another trunk line accessible in common to both groups of switches, a chain relay for the first group of switches, a chain relay for the second group of switches, circuits for said chain relays, a relay individual to each of the trunk lines accessible solely from the first group of switches for controlling the associated chain relay, similar relays for the trunk lines accessible solely from the second group of switches, and two relays individual to said common trunk, one of the latter relays controlling the circuit of the first chain relay and the other controlling the circuit of the second chain relay.

7. In a telephone system, two groups of secondary switches accessible, respectively, to two groups of primary switches, another secondary switch accessible in common to both groups of primary switches, means associated with the first group of primary switches for controlling the hunting action of the associated secondary switches, and similar means associated with the second group of primary switches, both of the last named means including means for controlling the hunting operation of the secondary switch common to both primary groups.

8. In a telephone system, a group of secondary switches accessible to a group of primary switches, a two-step relay common to the secondary switches operable through its first step to control the hunting action of the secondary switches when only one secondary switch is idle to the primary switches and operable through its second step when all of said secondary switches are busy to said primary switches, and an indicating device operated each time said relay operates through its second step.

9. In a telephone system, a group of automatic hunting switches, said group of switches being divided into sub-groups, counting control apparatus common to the group, means responsive to an abnormally congested hunting condition within the group for starting said control apparatus, and means controlled by said control apparatus for stopping the hunting operation in all said sub-groups and for permitting the hunting operation to proceed thereafter in only one of said sub-groups at a time.

10. In a telephone system, two groups of secondary switches, another secondary switch, means associated with the first group of switches for controlling the hunting action thereof, similar means associated with a second group of switches, and means including both of the last named means for controlling the hunting operation of said other switch.

11. In a non-numerical trunking system in which the primary trunks terminate in non-numerical switches having stepping magnets and having access to secondary trunks and in which an intermediate distributing frame is provided through which the primary trunks are connected by means of jumpers to the secondary switches, circuits for the stepping magnets of the secondary switches including said jumpers, and relays connected in said primary trunks on the primary trunk side of the intermediate distributing frame for controlling said stepping magnet circuits.

12. In a telephone system, a group of secondary switches accessible to a group of primary switches, a control circuit common to the secondary switches, means controlled over said control circuit when only one secondary switch is idle for starting a hunting action within the secondary group, an indicating device, and means controlled over said control circuit responsive to all secondary switches being busy for operating said device.

13. In a telephone system, a plurality of groups of trunks, a plurality of automatic hunting switches, one for each trunk, each trunk including a test conductor, means for placing a busy potential on any test conductor under predetermined idle conditions of the associated trunk for rendering the trunk non-available, means effective responsive to the existence of a predetermined minimum number of available trunks in any group for causing the operation of the hunting switches of the idle trunks of the particular group, and limiting means for limiting the simultaneous hunting action to a predetermined maximum number of groups.

14. In a telephone system, a plurality of groups or trunks, a plurality of automatic hunting switches, one for each trunk, each trunk including a test conductor, means for placing a busy potential on any test conductor under predetermined idle conditions of the associated trunk for rendering the trunk non-available, means effective responsive to the existence of a predetermined minimum number of available trunks in any group for causing the operation of the hunting switches of the idle trunks of the particular group, and limiting means for limiting the simultaneous hunting action to a predetermined maximum number of groups, said last means including means responsive to the tendency to exceed said predetermined maximum number for stopping the hunting operation in all of said groups and for permitting the hunting operation to proceed thereafter in said groups one at a time.

15. In a telephone system, a plurality of trunk lines, each including at least one talking conductor and a test conductor, a plurality of automatic switches, each terminating one of said trunk lines, each switch including a motor magnet, means in each trunk line controlled over the talking conductor of the trunk responsive to the seizure of the trunk for opening a point in the circuit of the motor magnet of the associated switch, and means in each trunk controlled over the test conductor of the trunk independent of the other trunks for closing another point in the same circuit.

16. In a telephone system, a plurality of trunk lines each including a test conductor, a plurality of secondary line switches each terminating one of said trunk lines, each switch including a motor magnet controlled over a circuit including the test conductor of the associated trunk line, a relay in each trunk line, and means in each trunk line controlled by the associated relay independent of the corresponding relays of the other trunk lines to close a point in said circuit of its associated motor magnet.

17. In a telephone system a group of primary trunks each terminating in an automatic switch, a plurality of secondary trunks accessible to each switch said switches being of the type that are normally in selective position with respect to some secondary trunk, a circuit for controlling each of said switches, means in each trunk effective responsive to the seizure of the particular trunk with which the associated switch is in selective position for closing a point in the circuit of its associated switch, means responsive to the existence of predetermined conditions in the group of primary trunks for closing another point in the circuit of each of the switches, and means responsive to the seizure of any primary trunk for opening a point in the circuit of its associated switch, said three points in each circuit being connected in series.

18. In a telephone system, a plurality of primary trunk lines each terminating in an automatic switch, a plurality of secondary trunks accessible to each switch, the switches being of the type that are normally in selective position with respect to some secondary trunk, a circuit for controlling each switch, means for opening a point in said circuit of any switch responsive to the seizure of the associated primary trunk, and means in each trunk effective independent of the other trunks for closing a point in the circuit of its associated switch responsive to the seizure of the particular trunk with which the associated switch is in selective position.

19. In a telephone system, a group of primary trunk lines each terminating in an automatic switch, a group of secondary trunk lines accessible to each switch, a magnet for each switch, means responsive to the existence of predetermined conditions in the group of primary trunks for closing one point in the circuit of each magnet, means responsive to the existence of predetermined conditions in any group of secondary trunks for opening one point in the magnet circuits of all the switches having access to that group of secondary trunks, and means responsive to the seizure of a secondary trunk for closing one point in the circuit of the magnets of the switches that are in selective relationship with that particular secondary trunk, said three points being in series.

20. In a telephone system, a plurality of primary trunk lines each terminating in an automatic switch, a motor magnet for each switch, a plurality of secondary trunks accessible to each of said switches, said switches being normally in selective relationship with some trunk, means responsive to the existence of predetermined conditions in the group of primary trunks for closing one point in the circuit of each of said magnets, means responsive to the seizure of a secondary trunk for closing another point in the circuit of the magnet of only those switches that are in selective relationship with that secondary trunk, and means responsive to the seizure of any primary trunk for opening a third point in the circuit of its magnet, said three points being connected in series.

21. In a telephone system, an intermediate distributing frame, an automatic trunk hunting switch, a trunk connected to said switch through the intermediate distributing frame so as to make the switch individual to the trunk, and a magnet controlled by a plurality of relays individual to the trunk for operating said switch in its hunting movement, all of the relays that control the magnet and are individual to the trunk being on one side of the intermediate distributing frame and the magnet being on the other side of the frame.

22. In a telephone system, two serially related trunk lines, a switch individual to the first trunk line, bank contacts individual to the second trunk line engaged by the wipers of said switch, a circuit established responsive to the seizure of said first trunk line, said circuit including the two talking conductors of both trunk lines in series, a controlling relay for said switch included in said circuit, and a distributing frame carrying jumpers which are included in said first trunk line between the said controlling relay and said switch.

23. In a telephone system, a trunk line terminating in an automatic switch, a second trunk line terminating in a repeater, a line relay for controlling said switch, a distributing frame, a circuit including a jumper on said frame over which said control is exercised, a line relay in said repeater, and a circuit including a talking conductor of each trunk line for energizing both line relays in series.

24. In an electrical system, a plurality of similar elements, means to cause said elements to assume a plurality of different conditions, a circuit closed under the control of each of said elements when in a predetermined condition, and means responsive to the simultaneous closure of said circuit by a predetermined number of said elements to sound an alarm.

25. In a switching system, a plurality of hunting switches, a plurality of elements accessible to said switches, means to mark said elements as selectable or non-selectable, means to cause said switches to hunt for a selectable element, and means to indicate when a predetermined number of said switches are hunting for selectable elements at the same time.

26. In a switching system, a plurality of hunting switches, a plurality of elements accessible to said switches, means to mark said elements as selectable or non-selectable, means to cause said switches to hunt for a selectable element, and means responsive when a predetermined number of said switches hunt for selectable elements simultaneously for more than a predetermined length of time to sound an alarm.

27. In a switching system, a plurality of hunting switches, a plurality of elements accessible to said switches, means to mark said elements as selectable or non-selectable, means to cause said switches to hunt for a selectable element, an alarm, and means to sound said alarm when a predetermined number of said switches are hunting for selectable elements at the same time comprising a marginal relay, an interrupter and a circuit for said relay controlled by said switches and said interrupter.

28. In a switching system, a plurality of hunting switches, a plurality of elements accessible to said switches, means to mark said elements as selectable or non-selectable, means to cause said switches to hunt for a selectable element, an alarm, and means responsive when a predetermined number of said switches hunt for selectable elements simultaneously for more than a predetermined length of time to sound said alarm, comprising a marginal relay, a first interrupter, circuits for said relay controlled by said switches and said interrupter, a second interrupter, and a circuit for said alarm controlled by said marginal relay and said second interrupter.

29. In an electrical system, a plurality of elements each having a plurality of possible conditions, and means for sounding an alarm when a predetermined number of said elements are simultaneously in the same predetermined condition comprising a marginal relay operable through a resistance of not more than a predetermined value, parallel circuits for said relay each containing a resistance having a value which is a multiple of said predetermined value closed by said elements when in said predetermined condition and an alarm responsive to said marginal relay.

30. In a switching system, a plurality of elements, means for marking said elements as selectable or non-selectable, a switch, means to operate said switch to select one of said elements, and means individual to said switch to disable said operating means if all of said elements are non-selectable.

In witness whereof, I hereunto subscribe my name this 21st day of April, A. D. 1931.

JOHN WICKS.